United States Patent Office 3,069,461
Patented Dec. 18, 1962

3,069,461
PEROXIDE OXIDATION OF POLYHALO-
BENZALDEHYDES
Henri Sidi, Paramus, N.J., assignor to Heyden Newport Chemical Corporation, New York, N.Y., a corporation of Delaware
No Drawing. Filed June 5, 1958, Ser. No. 739,970
9 Claims. (Cl. 260—523)

This invention relates to the oxidation of polyhalobenzaldehydes to the corresponding polyhalobenzoic acid. More particularly, this invention relates to the oxidation of polyhalobenzaldehydes to the corresponding acid by the use of hydrogen peroxide in the presence of an inorganic salt.

Polyhalobenzoic acids, particularly trichlorobenzoic acid, have been found useful as herbicides. Among the various isomers of trichlorobenzoic acid, the herbicidal activity of the 2,3,6 isomer has been found to be greater than that of the other isomers. For this reason, it is most desirable to obtain a trichlorobenzoic acid mixture rich in the 2,3,6 isomer.

Trichlorobenzoic acid may be prepared by nuclearchlorinating toluene or o-chlorotoluene in the presence of a catalyst such as iron or aluminum chloride. Said reaction will yield a nuclear-chlorinated toluene consisting mainly of the 2,3,4-2,3,6 and 2,4,5 trichloro isomers. The trichlorotoluene isomers are then side-chain chlorinated to yield a mixture of trichlorobenzal chloride and trichlorobenzotrichloride. The above reactions may be illustrated by the following equations, it being understood that HCl is also formed:

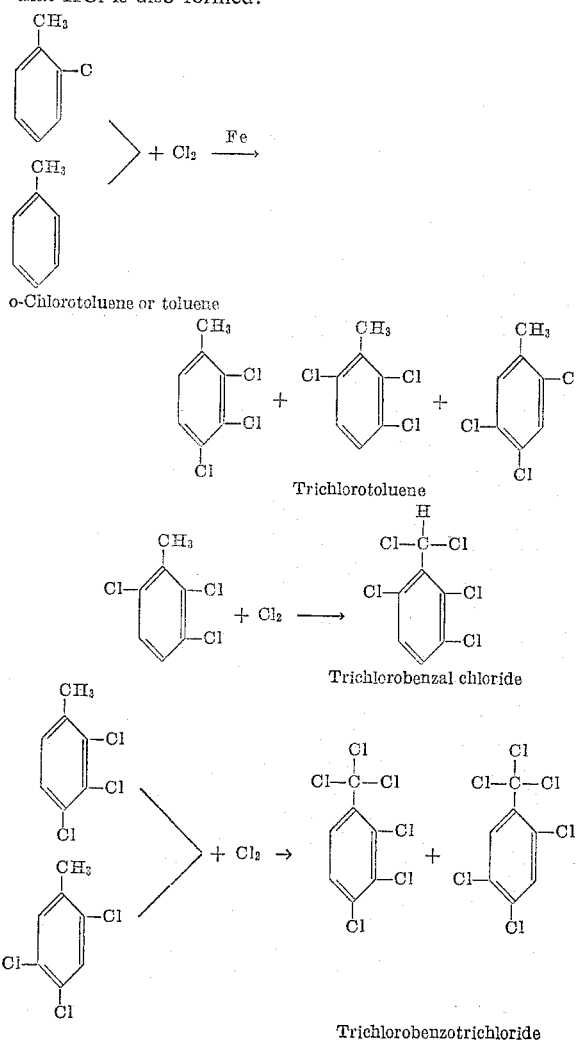

By hydrolysis of the benzal chloride and benzotrichloride, a mixture of trichlorobenzaldehyde and trichlorobenzoic acid is obtained. The following reaction illustrates the hydrolysis step:

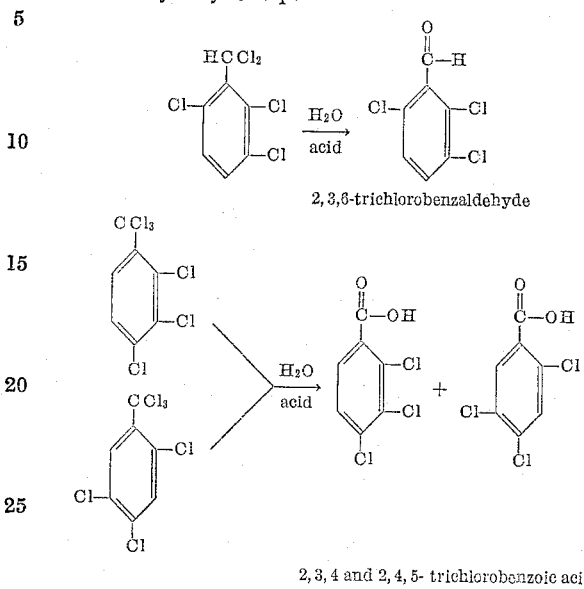

If desired, the aldehyde and acid may be separated by rectification or solvent extraction. It is preferably separated by solvent extraction with a sodium carbonate solution.

It is to be noted that the side-chain chlorination resulted in the formation of different products from a standpoint of the number of chlorine atoms attached to the side-chain carbon. In the case of the 2,6 isomer having two chlorine atoms ortho to the methyl group, only two chlorine atoms replace hydrogen on the side-chain carbon, whereas with the 2,3,4 and 2,4,5 isomers having only one chlorine atom ortho to the methyl group, chlorine replaces three hydrogen atoms on the side-chain carbon. Thus, upon subsequent hydrolysis, the dichloro side-chain compound yields the trichlorobenzaldehyde and the trichloro side-chain compound yields the trichlorobenzoic acid. The difference in functional groups, i.e. aldehyde and acid, allows for the easy separation of the 2,3,6 trichloro compound.

The significance of the separation is that an acid mixture enriched in 2,3,6 isomer may be obtained in high yield by oxidation of the intermediate aldehyde. As stated previously, the 2,3,6 isomer is the most effective herbicide. The 2,3,6 acid-rich mixture may be used as is or may be further blended with the acid product of the hydrolysis, or with a trichlorobenzoic acid, otherwise produced and with little or no 2,3,6 isomer, to yield an ultimate product of desired and controlled content of 2,3,6 trichlorobenzoic acid.

It is at this point that the conversion of toluene or o-chloro toluene to the benzoic acid has been troublesome. That is, heretofore the conversion of the 2,3,6 trichlorobenzaldehyde to the benzoic acid has resulted in poor yields of acid. Certain of the oxidizing agents have resulted in ring rupture and milder agents have resulted in low conversion.

While it is known that polyhalo aromatic aldehydes may be oxidized to the acid by using hydrogen peroxide as the oxidizing agent, the use of such peroxide has resulted in low yields; so that despite the decided advantages of using hydrogen peroxide as an oxidizing agent, that is, freedom from residual salts, precipitates and gases, hydrogen peroxide, heretofore, has been found unsuitable as an oxidizing agent.

The difficulty of completing the oxidation of polyhalobenzaldehydes with hydrogen peroxide is increased by the immiscibility of the aldehyde and peroxide, said peroxide usually added as a water solution. It has been found that the rate may be increased by removing the acid as a water soluble salt. Therefore, by operating an alkaline system, the acid may be dissolved in the aqueous phase of the system. However, the use of an alkaline medium accelerates the decomposition of hydrogen peroxide and prevents full utilization of same.

Moreover, the polyhalobenzaldehydes being solid at room temperature, require elevated temperatures to liquefy the aldehyde to speed up the oxidation. Unfortunately, high temperatures ordinarily hasten the decomposition of peroxides.

Thus, we find two reaction conditions, viz. high temperature and alkalinity, which render unsuitable the use of hydrogen peroxide as the oxidizing agent for polyhalobenzaldehydes.

It is an object of this invention to utilize the advantages of oxidizing with hydrogen peroxide which may be added to the reaction mixture as such or may be formed in situ.

It is a further object of this invention to provide a method for oxidizing polyhalobenzaldehyde to the corresponding benzoic acid in high yield.

Further objects will appear to those skilled in the art as the description of this invention unfolds.

Generally stated, this invention involves the oxidation of polyhalobenzaldehydes by a hydrogen peroxide in the presence of certain inorganic salts. It has been further discovered that the conversion of polyhalobenzaldehyde to the acid by hydrogen peroxide in the presence of certain inorganic salts is further improved by controlling the pH of the system.

The term "hydrogen peroxide" as used in the specification and appended claims means hydrogen peroxide per se and also addition salts of hydrogen peroxide such as, but not limited to, sodium peroxide, sodium pyrophosphate peroxide and sodium carbonate peroxide.

The oxidation with hydrogen peroxide is performed in an alkaline medium, thus converting the acid formed into a water-soluble salt. The concentration of hydrogen peroxide added to the reaction mixture may vary over a broad range, however, a concentration of 10–30% has been found suitable. Such concentration is commercially available and is commonly known as 100–130 volume peroxide.

Stabilizing salts found suitable for use in this invention for use as promotors are those water-soluble salts which increase the stability of hydrogen peroxide in aqueous alkaline medium at pH value of 8, or higher. Illustrative hydrogen peroxide stabilizers are sodium pyrophosphate, sodium borate, sodium tartrate and sodium citrate. Salts of other alkali metals as well as salts of alkaline earth metals and heavy metals may be used provided that the salts are sufficiently water soluble under alkaline conditions, that is, soluble in the amount required. The suitability of a salt can be readily determined by adding a small amount of the salt to an alkaline solution of hydrogen peroxide and heating this solution and determining the amount of hydrogen peroxide remaining in solution as compared to the amount of hydrogen peroxide remaining in a heated similar alkaline solution not containing the salt. For example, two portions of test solutions of 0.15% $H_2O_2$ in water can be prepared and the pH value of each adjusted to 10.5 by the addition of 0.01 N sodium hydroxide. Then 0.01 mole of a salt per liter of test solution can be added to one of the portions and both portions heated for one hour at 50° C. After heating, the percentage of hydrogen peroxide remaining in each portion is determined and if there is a higher percentage of the hydrogen peroxide in the salt-containing portion than in the portion used for comparative purposes, then the salt is a hydrogen peroxide-stabilizing salt and can be used in the present process.

The amount of stabilizing salt added may vary widely and as little as 0.5% by weight based on the amount of aldehyde effects an improvement although somewhat larger amounts are preferred with about 10% of salt based on the weight of aldehyde producing very good results. Large excesses may be used and 20%, or more, may be used with the upper limit being a matter of economics rather than chemical inoperability. Many of these salts form complexes with hydrogen peroxide and when such a complex is used, then the amount of salt added is a function of the amount of hydrogen peroxide required to oxidize the aldehyde as these complexes release hydrogen peroxide to the reaction mixture. Illustrative complexes are sodium pyrophosphate peroxide and sodium perborate.

Theoretically, the reaction proceeds on a mole of aldehyde per mole of peorxide basis. However, it is desirable to provide an excess of peroxide.

While the hydrogen peroxide may be added to the reaction vessel in toto at one time, it is preferred that a gradual addition of peroxide take place.

In addition to stabilizing the peroxide, the salts of this invention function as wetting agents. Thus, the addition of sodium pyrophosphate, for example, allows for greater wetting or dispersion of the water-insoluble aldehyde with aqueous peroxide and therefore increased rate of reaction.

It will serve well to again point out that for the purposes of this invention it is not imperative that the hydrogen peroxide be charged to the reaction as such, but that it may be introduced as a peroxide addition salt such as, for example, sodium pyrophosphate peroxide.

The oxidation may be run at a temperature slightly above the solidification point of the aldehyde.

As stated previously, the recovery has been further increased by controlling the pH of the system. Thus, it is most desirable that the pH be maintained between 8–10, although higher pH values may be used. This may be done by adjusting the pH by the addition of an alkaline salt-former during the reaction. Sodium hydroxide has been found suitable for this purpose. However, any other water-alkaline compound may be used that will react with the trichlorobenzoic acid as it is to form a water salt of this acid.

The following examples will serve to explain the invention and are intended solely as illustrations.

EXAMPLE I

*Oxidation of Trichlorobenzaldehyde With Hydrogen Peroxide in Alkaline Medium*

In a suitable vessel equipped with agitating means, a mixture of 48.3 grams of trichlorobenzaldehyde (assay 86.8%), 10.0 grams of sodium hydroxide and 500 mls. of water was heated to 90° C. While agitating and maintaining the mixture at 90°–95° C., a total of 34.0 grams of 30.0% hydrogen peroxide (200% of theory) was added to the mixture over a one-hour period. To complete the reaction, the mixture was refluxed for an additional hour. Test for peroxides was negative. The reaction mass was then extracted with toluene. The aqueous layer from the extraction was then clarified. Acidification of clarified layer with concentrated hydrochloric acid to pH of 1 precipitates the acid product as an oil which solidified when stirred and cooled to 10° C. After filtering, the precipitate was washed twice with 25 ml. portions of water and dried in vacuum oven at 70° C. The acid product weighed 24.0 grams which represented a yield of 53.3% based on the aldehyde charged. Of the 24.0 grams of acid product, 74.6% was the 2,3,6 isomer of trichlorobenzoic acid.

EXAMPLE II

Into a flask equipped with an agitator there was charged 51.0 grams of trichlorobenzaldehyde, 10 grams of sodium hydroxide, 500 ml. of water, 2.5 grams of sodium pyrophosphate and 34 grams of 30% hydrogen peroxide. The reaction mixture was agitated and gradually heated from 25° to 60° C. at the rate of 10° C. every 30 minutes and held at 60° C. for 1 hour. The mixture was then gradually heated to 100° C. and refluxed for one hour. Upon cooling the test for peroxides was negative. The clarified aqueous liquor was acidified with 50 ml. of 37% HCl. The precipitation was separated by filtration, washed with water and dried in a vacuum oven. The yield of trichlorobenzoic acid was 82% based on the amount of aldehyde charged. The acid contained 85.4% of the 2,3,6 isomer.

EXAMPLE III

*Oxidation of Trichlorobenzaldehyde With Sodium Pyrophosphate Peroxide*

Into a suitable vessel equipped with agitating means was charged a mixture of 51.0 grams of trichlorobenzaldehyde (assay 82%), 10.0 grams of sodium hydroxide, 500 mls. of water and 70.0 grams of sodium pyrophosphate peroxide (9% active $O_2$) (200% theory). The reaction mixture was agitated and gradually heated to 90° C. and maintained with agitation at this temperature for one hour. After this, the reaction liquor was refluxed for an additional hour. The test for peroxides was negative. After clarification, the mother liquor was acidified with concentrated hydrochloric acid to pH 1 to precipitate the trichlorobenzoic acid. The solid precipitate was washed with two 25 ml. portions of water and dried in vacuum oven at 70° C. for three hours. The acid product weighed 38.3 grams, which represented a yield of 85% based on the aldehyde charged. Of the 38.3 grams of acid product, 82% was the 2,3,6 isomer of trichlorobenzoic acid.

EXAMPLE IV

*Oxidation of Trichlorobenzaldehyde With Hydrogen Peroxide in the Presence of Sodium Pyrophosphate at a Controlled pH*

In a suitable vessel equipped with agitating means was mixed 50.0 grams of trichlorobenzaldehyde (assay 82.4%), 400 ml. water and 5.0 grams of sodium pyrophosphate. The reaction was heated to 80° C. and 5 ml. of a total of 50.0 grams of hydrogen peroxide (assay 26.8%) was added. The reaction mixture was heated and stirred until the pH value dropped to 8. Then 5 ml. of a 10% sodium hydroxide solution was added to raise the mass to pH 9.5. Alternate portions of sodium hydroxide solution and hydrogen peroxide were added so that at all times the pH of the reaction mixture was maintained between about 8–10 and at a temperature between about 80°–90° C. At the end of the addition, the reaction mixture was refluxed for one hour. After clarification, the reaction liquor was acidified to pH 1 with concentrated hydrochloric acid. The resultant precipitate of acid product was separated from the liquor and washed twice with 25 ml. portions of water and dried in a vacuum oven at 70° C. A weight of 40.5 grams of trichlorobenzoic acid was recovered which represented a yield of 91.3% based on aldehyde charged. The yield of 2,3,6-isomer was 87.1%.

Examples II, III and IV illustrate the substantial improvement in yield obtained by following the teachings of this invention as opposed to the process taught by the prior art as shown in Example I.

The present invention can be used for oxidizing any polychlorobenzaldehyde containing from 2–5 chlorine atoms on the benzene ring. The corresponding bromo compounds also may be utilized. The principles of the present invention are especially useful in oxidizing the polyhalobenzaldehydes having a halogen atom in each of the 2 and 6 positions adjacent the CHO side chain.

This invention has been explained and illustrated in what is thought to be the best embodiment of the invention. However, it is to be understood that various modifications may be made without departing from the spirit or scope of the invention.

I claim:

1. Process for converting a polyhalobenzaldehyde selected from the group consisting of polychlorobenzaldehydes and polybromobenzaldehydes to a salt of the corresponding polyhalobenzoic acid comprising oxidizing said benzaldehyde with at least one mole of a hydrogen peroxide compound selected from the group consisting of hydrogen peroxide and addition salts of hydrogen peroxide per mole of said benzaldehyde in an aqueous medium at a pH value above 8 and at a temperature between the melting point of said benzaldehyde and the reflux temperature of the reaction mixture, said aqueous medium having dissolved therein a hydrogen peroxide-stabilizing salt selected from the group consisting of alkali metal, alkaline earth metal and heavy metal phosphates, borates, tartrates, and citrates in an amount at least equal to 0.5% of the amount of said benzaldehyde.

2. Process for converting a polychlorobenzaldehyde having a chlorine atom in each of the 2 and 6 positions adjacent the CHO group to a salt of the corresponding polychlorobenzoic acid comprising oxidizing said aldehyde with at least one mole of a hydrogen peroxide compound selected from the group consisting of hydrogen peroxide and addition salts of hydrogen peroxide per mole of said aldehyde in an aqueous medium at a pH value between 8 and at a temperature above the melting point of said polychlorobenzaldehyde and the reflux temperature of the reaction mixture, said aqueous medium having dissolved therein a hydrogen peroxide-stabilizing salt selected from the group consisting of alkali metal, alkaline earth metal, and heavy metal phosphates, borates, tartrates, and citrates in an amount at least equal to 0.5% of said polychlorobenzaldehyde.

3. Process for converting a polychlorobenzaldehyde to a salt of a polychlorobenzoic acid comprising oxidizing said polychlorobenzaldehyde with at least one mole of hydrogen peroxide per mole of polychlorobenzaldehyde in an aqueous medium and in the presence of a salt selected from the group consisting of alkali metal, alkaline earth metal, and heavy metal phosphates, borates, tartrates, and citrates wherein said salt is present in an amount at least equal to 0.5% of the amount of said polychlorobenzaldehyde and wherein the reaction mass is maintained at a pH value between 8 and 10 at a temperature in the range of from the melting point of said polychlorobenzaldehyde to the reflux temperature.

4. Process for converting 2,3,6-trichlorobenzaldehyde to a salt of 2,3,6-trichlorobenzoic acid comprising oxidizing said 2,3,6-trichlorobenzaldehyde with at least one mole of hydrogen peroxide per mole of 2,3,6-trichlorobenzaldehyde in an aqueous sodium hydroxide solution and in the presence of a salt selected from the group consisting of alkali metal, alkaline earth metal, and heavy metal phosphates, borates, tartrates, and citrates, wherein said salt is present in an amount at least equal to 0.5% of the amount of said 2,3,6-trichlorobenzaldehyde and wherein the reaction mass is maintained at a pH value above 8 and at a temperature in the range of from the melting point of said 2,3,6-trichlorobenzaldehyde to the reflux temperature.

5. Process of converting a trichlorobenzaldehyde to a salt of a trichlorobenzoic acid comprising oxidizing the trichlorobenzaldehyde by the gradual addition of at least one mole of a hydrogen peroxide compound selected from the group consisting of hydrogen peroxide and addition salts of hydrogen peroxide per mole of trichlorobenzaldehyde in aqueous solution and in the presence of a salt selected from the group consisting of alkali metal, alkaline earth metal and heavy metal phosphates, borates, tartrates, and citrates, wherein said salt is present in an amount at least equal to about 0.5% of the amount of trichlorobenzaldehyde and wherein the reaction mass is maintained at a pH value between 8–10 and at temperature between 80° C. and reflux temperature during the addition of the peroxide.

6. Process of converting a trichlorobenzaldehyde to a salt of a trichlorobenzoic acid comprising oxidizing the trichlorobenzaldehyde with hydrogen peroxide by the gradual addition of at least one mole of hydrogen peroxide per mole of trichlorobenzaldehyde in aqueous sodium hydroxide solution and in the presence of sodium pyrophosphate in the amount of at least 0.5% of the amount of trichlorobenzaldehyde and wherein the reaction mass is maintained at a pH value between 8–10 and at temperature between 80° C. and reflux temperature during the addition of peroxide, acidifying the reaction liquor to precipitate the trichlorobenzoic acid, and separating the acid and mother liquor.

7. Process of converting 2,3,6-trichlorobenzaldehyde to a salt of 2,3,6-trichlorobenzoic acid comprising treating 2,3,6-trichlorobenzaldehyde with an aqueous solution of sodium hydroxide at a pH value above 8 containing at least one mole of sodium peroxide per mole of 2,3,6-trichlorobenzaldehyde, and the temperature of the reaction mixture being in the range of from the melting point of said 2,3,6-trichlorobenzaldehyde to the reflux temperature, thereby oxidizing the 2,3,6-trichlorobenzaldehyde to 2,3,6-trichlorobenzoic acid, the amount of sodium hydroxide in said aqueous solution being sufficient to react with the 2,3,6-trichlorobenzoic acid and form therewith the salt of said acid.

8. The process of converting 2,3,6-trichlorobenzaldehyde to the sodium salt of 2,3,6-trichlorobenzoic acid comprising treating 2,3,6-trichlorobenzaldehyde with an aqueous solution of sodium hydroxide having a pH value above 8 and containing at least one mole of sodium carbonate peroxide per mole of 2,3,6-trichlorobenzaldehyde, the temperature of the reaction mixture being in the range of from the melting point of said 2,3,6-trichlorobenzaldehyde to the reflux temperature, thereby oxidizing the 2,3,6-trichlorobenzaldehyde to 2,3,6-trichlorobenzoic acid, the amount of sodium hydroxide in said aqueous solution being sufficient to react with the 2,3,6-trichlorobenzoic acid and form therewith the sodium salt of said acid.

9. Process for converting 2,3,6-trichlorobenzaldehyde to the sodium salt of 2,3,6-trichlorobenzoic acid comprising treating 2,3,6-trichlorobenzaldehyde with an alkaline aqueous solution of sodium hydroxide at a pH value above 8 containing at least a mole of sodium pyrophosphate peroxide per mole of said aldehyde, the temperature of the reaction mass being in the range of from the melting point of said aldehyde to the reflux temperature, thereby oxidizing the 2,3,6-trichlorobenzaldehyde to 2,3,6-trichlorobenzoic acid, the amount of sodium hydroxide in said aqueous solution being sufficient to react with the 2,3,6-trichlorobenzoic acid and form the sodium salt of said acid.

References Cited in the file of this patent

UNITED STATES PATENTS 2,725,396    Winkler _____ Nov. 29, 1955

OTHER REFERENCES

Payne et al.: J.A.C.S., vol. 63, pages 226–8 (1941).
Brimelow et al.: Chem. Absts., vol. 46, col 2002–3 (1952).
Gilman: Organic Chemistry, vol. IV, pages 1153, 1154 and 1171–3 (1953).
Wagner et al.: Synthetic Organic Chemistry, page 419 (1953).
(Copies of above in Library.)